Patented Sept. 15, 1936

2,054,208

UNITED STATES PATENT OFFICE 2,054,208

PROCESS FOR THE MANUFACTURE OF FORMED ARTIFICIAL PRODUCTS

Leo Ubbelohde, Karlsruhe, Germany

No Drawing. Application February 3, 1932, Serial No. 590,779. In Germany February 10, 1931

7 Claims. (Cl. 18—54)

The invention relates to a process for the manufacture of artificial threads, fibres, ribbons and sheets from cellulose and derivatives of cellulose such as esters or ethers.

It has been found that artificial threads, fibres, ribbons and sheets of new and useful properties may be obtained if these products, during precipitation, come in contact with finely divided substances or mixtures of such substances.

According to the invention these substances are admixed to the precipitating bath in the form of an emulsion, a suspension, a mist or a dust according to the state of aggregation of the precipitating means or the dispersed substance.

It has been recognized that infusorial earth (kieselguhr) and other finely divided solid materials f. i. powder of glass, carborundum, precipitated silicium oxide and other adsorbent materials, clay, asbestos and other anorganic substances like metal oxides or salts; furthermore organic powdered materials such as starch, finely divided resins, oils and fats, solid and liquid hydrocarbons and artificial resins such as the products of condensation of phenol and formaldehyde, cellulose, derivates of cellulose and silk and artificial silk, resin-like materials and similar materials of any kind are suitable. Materials of irregular shape with sharp edges and well performed surface are particularly adapted for the process.

As to the dispersion in the precipitating means, the size of the particles is of less importance; emulsified liquid substances may also be employed instead of dispersed solid materials.

In the case of the dry spinning process i. e. the precipitating of the products by gases, the substances are suitably dispersed v. g. in the form of dust (smoke) or mist which may be obtained by previous fusing, a process well known in the art. Similar dispersions may also be used within the solution of the raw material i. e. cellulose-solution in cuprammonia, or viscose etc. The presence of the finely divided material may also be limited to these solutions.

The effect of the process may be increased by dissolving in the precipitating liquid, or in the spinning solution, or in both, other materials which increase the stability of the dispension or the sticking properties of the threads respectively. Thus, f. i., sulphonated fats may be added to the coagulating bath, or 3-oxytrimethylene-1.2-sulphide which has considerable sticking properties may be used within the solution of the raw material. The process shows its new effects as well in the cases where the finely divided substances are irremovably or difficultly removably incorporated as also in the cases where they are not or only temporarily incorporated by the substance of the artificial products.

The treatment by the dispersions may also be performed when the product is already somewhat coagulated, but has not yet lost its property to be influenced and changed by the dispersed substances. The process may also be performed by several steps by using different materials in emulsion or suspension v. g. in the form of mist or dust which react one after the other.

The dispersions of the powder, however, may also be produced outside the precipitating means and employed before the product is completely precipitated. Such means are liquids which have no coagulating effect or which cause only a slow precipitation. Within these means the dispersed particles may penetrate more easily the surface of the still weak filaments. Suitable liquids are pure water, solutions containing a small amount of alkaline substances or weak acids which have no influence or but a small influence on the cellulose-solutions.

The new effect of the process according to the invention consists in that the artificial products show in many cases new properties in respect to appearance or feeling which make them most suitable as well as the fabrics manufactured from the products. In the case of artificial threads produced according to the invention, these are workable more easily than the known products. In the case of staple-fibre the fibres may easily be spun like natural fibres; moreover the threads prove more suitable for weaving and knitting. It depends partly on the nature of the solution of the raw material, partly on the kind of the coagulating means and preferably on the nature and quantity of the employed finely divided substances, whether the first or the second effect mentioned above appears in the manufacture or both together. The surface of the products is more or less smooth or rough according to the quantity, the smoothness or roughness and the degree of hardness of the employed finely divided materials. Moreover the appearance and the feeling depend in high degree on the nature, the quantity, size and form of the particles.

Examples (1) 5 to 20 per cent. of finely divided infusorial earth or another substance or substances of suitable shape and size are mixed with, for example suspended within, the coagulating bath, for instance, in the case of viscose, with any one of the coagulating baths known in the viscose art and a viscose (prepared by any process for making viscose) is in a known manner spun into the thus obtained mixture of the coagulating bath and the solid or liquid substance. The coagulated threads are then finished in the usual manner. Ribbons and sheets are obtained in similar manner, using suitable mouth pieces or slots instead of spinning nozzles.

(2) The process is conducted as in Example 1, but with the difference that, instead of viscose, a cellulose solution in cuprammonia is employed and that as coagulating bath a coagulating bath known in the cuprammonia silk art is used, to which bath infusorial earth or any other suitable finely divided substance is added.

(3) Mode of procedure as in Example 1 or 2, but with the exception that, instead of a viscose or cuprammonia cellulose, a solution of cellulose nitrate or cellulose acetate in a volatile solvent is employed. As coagulating bath water or an acqueous solution of a salt, or the like, in short, any coagulating bath known in the cellulose nitrate or cellulose acetate art may be used, to which bath infusorial earth or any other suitable finely divided substance is added.

(4) Into viscose or into a solution of cellulose in cuprammonia or into a solution of cellulose nitrate or cellulose acetate in a volatile solvent 0.5 to 10 per cent. of finely divided infusorial earth is stirred in or kneaded in, and the homogeneous suspension is, according to the nature of the spinning solution, spun into one of the coagulating baths containing the finest divided substance mentioned in the foregoing examples.

(5) In the process according to Examples 1 to 4 substances may be added which make the suspension more stable, such as sulphonated fats and which increase the sticking properties of the formed threads such as glycerine sulphides, for example 3-oxytrimethylene-1.2-sulphide.

(6) In the evaporative spinning methods of cellulose nitrate or cellulose acetate of the like dispersions of solid or liquid substances in the form of dust of mist are admixed to the atmosphere within which the evaporation of the solvent or solvents takes place.

(7) The process is performed like the foregoing processes, using a solution of raw materials which contains air or gas or substances producing gases like sodium carbonate or substances which result in a dull lustre or gloss such as paraffine oils.

(8) Further variations of the effect may be obtained if the divided materials are dyed or originally coloured.

What I claim is:

1. That step in the manufacture of artificial silk which consists in ejecting a bundle of slightly spaced filaments of a cellulose solution into a precipitating bath containing a finely divided insoluble substance dispersed therein.

2. That step in the manufacture of artificial silk which consists in ejecting a bundle of slightly spaced filaments of a cellulose solution into a precipitating bath containing finely divided irregular particles of an insoluble substance dispersed therein.

3. In a process for the manufacture of shaped artificial products, the step of extruding cellulosic solutions into a precipitating bath containing dispersions of finely divided insoluble substances.

4. In a process for the manufacture of shaped artificial products, the step of ejecting a cellulosic solution containing 3-oxytrimethylene as a sticking substance, through an orifice into a precipitating bath containing in dispersion finely divided insoluble substances.

5. In a process for the manufacture of shaped artificial products, the step of ejecting a cellulosic solution through an orifice into a precipitating bath containing in dispersion finely divided insoluble substances and further substances adapted to stabilize such dispersions.

6. In a process for the manufacture of shaped artificial products, the step of ejecting a cellulosic solution containing a dispersion of finely divided and insoluble substances, through a suitably shaped orifice into a precipitating bath containing in dispersion finely divided insoluble substances.

7. In a process for the manufacture of shaped artificial products, the step of ejecting a cellulosic solution containing a dispersion of finely divided and insoluble substances, through a suitably shaped orifice into a precipitating bath containing in stabilized dispersion finely divided insoluble substances.

LEO UBBELOHDE.